United States Patent [19]

Yazaki

[11] Patent Number: 4,590,798
[45] Date of Patent: May 27, 1986

[54] APPARATUS FOR DETECTING OIL LEVEL IN OIL TANK OF SMALL-SIZED MARINE CRAFT

[75] Inventor: Mitsuhiro Yazaki, Kakogawa, Japan

[73] Assignee: Kawasaki Jukogyo Kabushiki Kaisha, Kobe, Japan

[21] Appl. No.: 686,687

[22] Filed: Dec. 27, 1984

[30] Foreign Application Priority Data

Dec. 28, 1983 [JP] Japan ............................ 58-202320[U]

[51] Int. Cl.$^4$ ............................................. G01F 23/02
[52] U.S. Cl. ........................................ 73/323; 73/330; 116/227
[58] Field of Search .................. 73/323, 330; 116/227, 116/276

[56] References Cited

U.S. PATENT DOCUMENTS

| | | | |
|---|---|---|---|
| 1,210,385 | 12/1916 | Hunziker | 73/323 |
| 2,374,142 | 4/1945 | Steven | 116/227 X |
| 2,468,833 | 5/1949 | Murphy | 116/227 |
| 2,678,623 | 5/1954 | Rainsford | 116/276 |
| 2,904,999 | 9/1959 | Quinn | 116/276 X |
| 3,049,922 | 8/1962 | Schwaneke | 73/323 |
| 3,085,424 | 4/1963 | Berg | 116/227 X |
| 3,417,730 | 12/1968 | Colley et al. | 116/276 X |
| 4,541,277 | 9/1985 | Starnes, Jr. | 73/334 X |

FOREIGN PATENT DOCUMENTS 53-7144 2/1978 Japan ............................ 73/290 R Primary Examiner—Daniel M. Yasich
Attorney, Agent, or Firm—Leydig, Voit & Mayer, Ltd.

[57] ABSTRACT

An apparatus for detecting the oil level in an oil tank of a marine craft. The fuel inlet of a fuel tank which is disposed within a craft body is provided outside of the craft body in an exposed state. The oil tank is arranged adjacently to the fuel tank, and an oil level detecting means for this oil tank is arranged adjacently to the fuel inlet such as to allow the oil level to be directly observed from the outside of the craft body.

8 Claims, 4 Drawing Figures

APPARATUS FOR DETECTING OIL LEVEL IN OIL TANK OF SMALL-SIZED MARINE CRAFT

BACKGROUND OF THE INVENTION

Field of the Invention

This invention relates to apparatuses for detecting the oil level in an oil tank, and more particularly to an apparatus for detecting the oil level in the oil tank of a small-sized marine craft such as a jet-propelled water ski, which avoids the risk of overlooking the shortage of oil.

In some small-sized marine crafts such as a jet-propelled water ski, an oil tank is provided as well as a fuel tank.

In this case, the oil tank may be disposed in the lower part of the deck of the craft with the oil inlet extended up to the upper part of the deck. (See Japanese Utility Model Laid-Open No. 7144/1978.)

It is desirable that a marine craft which has two tanks, namely an oil tank as well as a fuel tank, should be designed such as to prevent the possibility of the supply of fuel and oil being forgotten.

There is no probability of forgetting to refuel by virtue of a means which indicates that fuel has run out and which is provided exclusively for its purpose. As to oil, however, in most cases the shortage of oil is recognized by directly observing a level gauge, and when the level gauge is located remote from the position of the fuel inlet, the probability of forgetting to supply oil is increased.

SUMMARY OF THE INVENTION

Accordingly, it is an object of the invention to eliminate the above drawback and to enable easy and habitual checking of the residual amount of oil at the time of refilling such as to prevent the possibility of the supply of oil being forgotten.

To this end, in this invention, the fuel inlet of a fuel tank which is disposed within the hull or craft body is provided outside the craft body in an exposed state, an oil tank is arranged adjacently to the fuel tank, and an oil level detecting means for this oil tank is arranged adjacently to the fuel inlet such as to allow the oil level to be directly read from the outside of the craft body.

The above other objects, features and advantages of the present invention will become clear from the following description of the preferred embodiments there, taken in conjunction with the accompanying drawings.

DESCRIPTION OF THE PREFERRED EMBODIMENTS

Hereinunder this invention will be described in detail with reference to the accompanying drawings.

Figure 1:
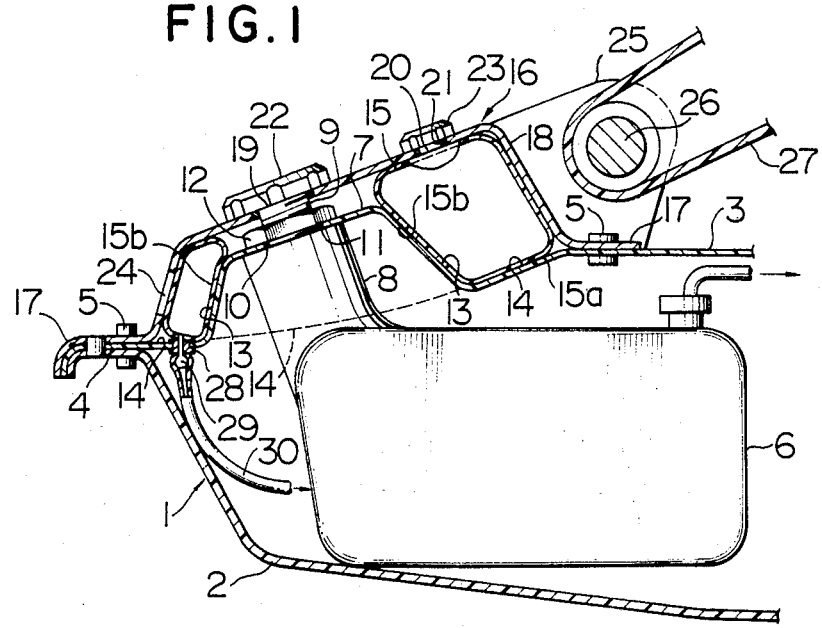
FIG. 1 is a vertically-sectioned side elevated view taken along the center line of a jet-propelled water ski incorporating a first embodiment of an oil level detecting means according to the invention.

Referring first to FIG. 1, a craft body 1 made of fiber reinforced plastic (FRP) is composed of walls, specifically a hull 2 constituting the bottom part, and a deck 3 constituting the upper part, these two parts being secured to one another as by bonding together the outer peripheral flanges 4 thereof.

A fuel tank 6 is disposed substantially below the deck 3. A receiver portion 7 of a frustoconical configuration is formed in the widthwise center of the deck 3. A communicating pipe 8 of the fuel tank 6 is kept in contact with the central portion of the upper surface of the receiver portion 7, and a fuel inlet 9 projecting from the communicating cylinder 8 is extended to the outside of the receiver portion 7 through a through hole 10 formed in the center of the receiver portion 7. The fuel inlet 9 is secured to the receiver by an O-ring 11 and a clamping nut 12.

The receiver portion 7 of the deck 3 has a first setting surface 13 which widens toward the lower end thereof on the outer periphery of the receiver portion 7. The portion of the deck 3 corresponding to the outer periphery of the first setting surface 13 is formed as a second setting surface 14 which inclines slightly towards the fore body of the craft 1.

Figure 2:
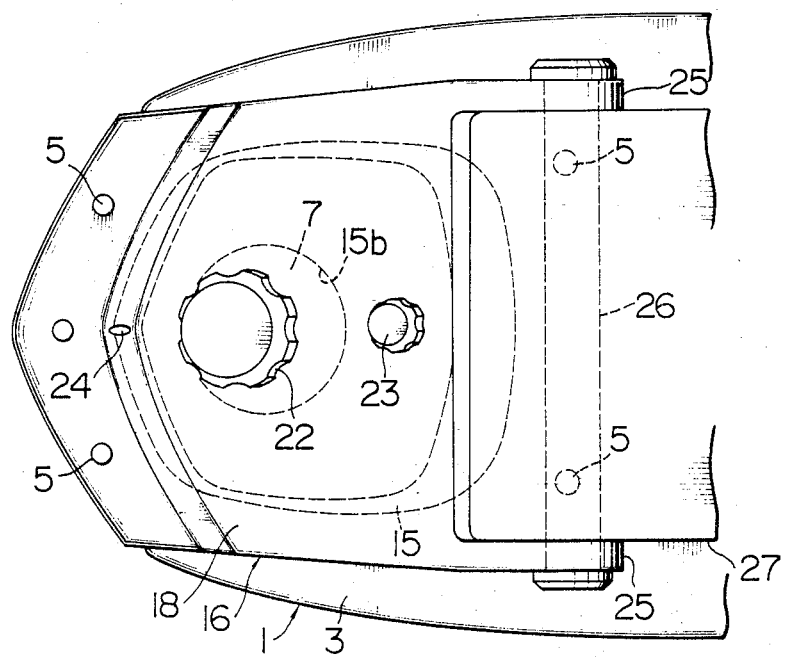
FIG. 2 is a plan view of the first embodiment shown in FIG. 1.

An oil tank 15 is made of a transparent resin. The oil tank 15 is provided in the center thereof with a fitting opening 15b in FIG. 2 which widens toward the lower end thereof such that the oil tank 15 has a hollow inside. That is, the oil tank 15 is formed in the shape of a torus as is shown in FIG. 2, the front portion thereof corresponding to the fore body of the craft 1, namely the left part of FIG. 1, being made narrow and the rear portion wide.

This oil tank 15 is placed on the deck 3 in a state slightly inclined toward the fore body of the craft 1 such that the narrow front portion thereof is lower than the rear portion. At this time, the bottom portion 15a of the tank 15 is placed on the second setting surface 14 and the fitting opening 15b in the central portion is engaged with the first setting surface 13 such that the taper of the adjoining surfaces matches. In this way, the oil tank 15 is disposed adjacently to the fuel tank 6.

The oil tank 15 fitted to the fuel tank 6 in this way is fixed by pressing it downwardly with a tank cover 16. The tank cover 16 made of a metal has a protruded pressing portion 18 between the front and rear portions of a flange 17 which fits to the upper surface and the outer peripheral surface of the oil tank 15. The front portion of the flange 17 is secured to the outer peripheral flange 4 with rivets 5 and the rear portion of the flange 17 is secured to the deck 3 with rivets 5. The tank cover 16 has a first retaining bore 19 for retaining the fuel inlet 9 and a second retaining bore 21 for retaining the oil inlet 20 of the oil tank 15, the first retaining bore 19 formed in the front portion of the upper surface of the tank cover 16, while a second retaining bore 21 formed in the rear portion of the upper surface the tank cover 16. Filler caps 22, 23 are attached to each of the filler ports 9, 20. Moreover, the tank cover 16 is provided with an oil detecting means or window viewing means 24 by slitting the front surface thereof such taht the oil level in the oil tank 15 can be directly observed, and the detecting means 24 is arranged adjacently to the fuel inlet 9.

At the rear end of the tank cover 16 a pair of pole brackets 25 are respectively provided on the right and left sides thereof integrally with the cover 16 such as to project from the cover 16 and to support the fore ends of a handle pole 27 formed of FRP disposed through the pole shaft 26. However, the handle pole 27 may be supported by a bracket exclusively made for that purpose separately from the tank cover 16. The reference numeral 28 in FIG. 1 denotes a grommet attached to the deck 3. A guide pipe 29 is led from the oil tank 15 through the grommet 28 and is connected to an oil pipe 30, through which an oil pump of an engine (not shown) sucks oil and supplies it to the later stages of a carburetor.

In the above structure the oil level detecting means 24 are arranged adjacently to the fuel inlet 9. Therefore, at the time of refueling the oil level detecting means 24 cannot fail to be seen habitually, which eliminates the risk of overlooking the shortage of oil and forgetting to supply oil.

Figure 3:
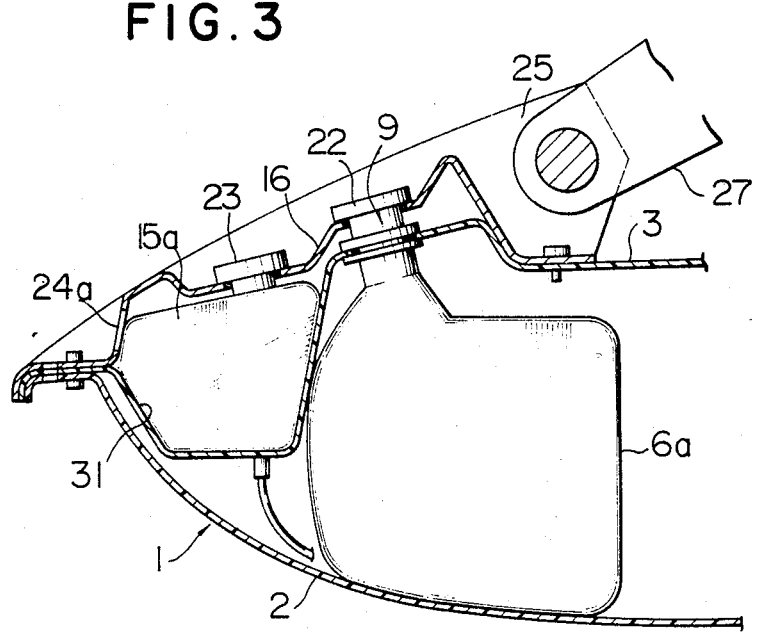
FIG. 3 is a vertically-sectioned side elevated view taken along the center line of a jet-propelled water ski incorporating a second embodiment of an oil level detecting means according to the invention.

FIG. 3 shows a second embodiment. The tank cover 16 with which a pair of pole brackets 25 are integrally provided, is secured to the deck 3 in the same way as in the first embodiment. The fuel tank 6a is disposed at a position closer to the rear portion than in the first embodiment shown in FIG. 1. In the front portion of the deck 3, a tank receiving recess 31 is formed for receiving an oil tank 15a. In this case, the oil level detecting means 24a is provided by slitting the portion of the tank cover 16 corresponding to the front portion of the oil tank 15a. In this way, the oil tank 15a is arranged adjacent to the front portion of the fuel tank 6a and the oil level detecting means 24a is favorably located adjacent to the fuel inlet 9.

Figure 4:
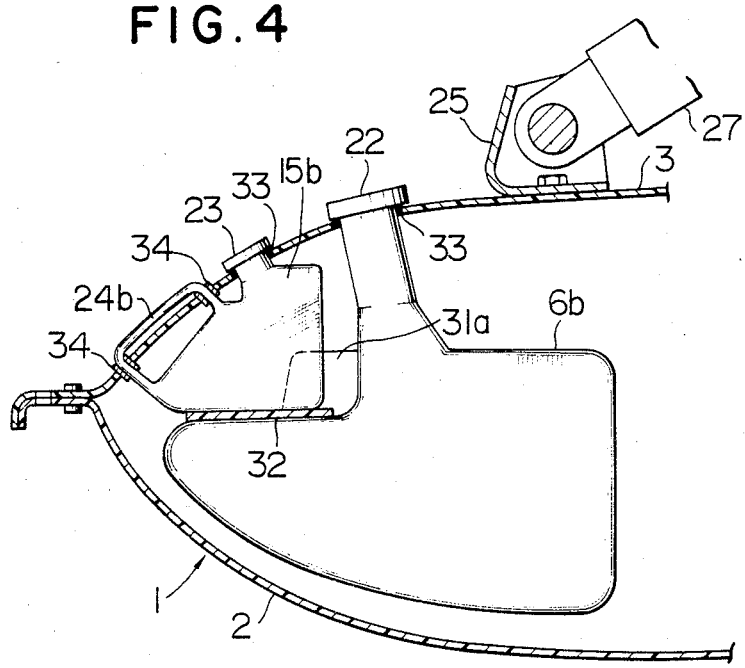
FIG. 4 is a vertically-sectioned side elevated view taken along the center line of a jet-propelled water ski incorporating a third embodiment of an oil level detecting means according to the invention.

A third embodiment illustrated in FIG. 4 shows an example of a structure in which the fuel and oil tanks 6b, 15b are in the craft body 1 which has the ordinary deck 3 without the tank cover 16 such as is shown in FIG. 3. In this case, in the front portion of the fuel tank 6b itself is formed a tank receiving recess 31a and a cushion 32 is arranged at the bottom portion of the tank receiving recess 31a such as to support the oil tank 15b by being inserted into the tank receiving recess 31a in such a state that it is cushioned by the cushion 32. The oil level detecting means 24b is a viewing means in this embodiment and is transparent and pipe-like and is disposed in the front portion of the oil tank 15b, such as to project to the outside of the deck 3. In this way, the oil tank 15b is arranged adjacently to the fuel tank 6b, and the oil level detecting means is arranged adjacent to the fuel inlet 9. Also provided are O-rings 33 for forming a seal around each of the filler ports 9, 20 and cylindrical seals 34 in the apertures in the walls of the deck 3 for closing the retaining portions of the oil level detecting means 24b.

Thus, in each of the embodiments shown in FIGS. 3 and 4, the oil level detecting means 24 is adjacent to the fuel inlet 9.

As described above, according to the invention, the fuel inlet of a fuel tank which is provided within the hull projects from the hull in an exposed state, an oil tank is disposed adjacent to the fuel tank, and an oil level detecting means is arranged adjacent to the fuel tank inlet such as to be observed from the outside of the craft body. Accordingly, easy and habitual checking of the residual amount of oil at the time of refuelling is enabled, which avoids the risk of forgetting to supply oil, and hence, prevents trouble.

While there has been described what are at present considered to be the preferred embodiments of the invention, it will be understood that various modifications may be made thereto, and it is intended that the appended claims cover all such modifications as fall within the true spirit and scope of the invention.

What is claimed is:

1. In a marine craft including a body defined by walls and a fuel tank and an oil tank located within the body, an aid to determining the level of oil in the oil tank, comprising:

said oil tank having an oil inlet projecting through one of the walls in the marine craft and positioned adjacent said fuel tank;

said fuel tank having a fuel inlet projecting through said one of said walls so that said fuel inlet is visible from a location outside of said body; and an oil tank detecting means arranged adjacent to said fuel inlet and including viewing means in said one of the walls of said marine craft so as to be visible from the outside of said body.

2. The aid to determining the level of oil in an oil tank according to claim 1 wherein said one of said walls through which said fuel inlet projects comprises a cover for said oil tank.

3. The aid to determining the level of oil in an oil tank according to claim 1 wherein said detecting means comprises an oil tank formed from a transparent material and one of said walls proximate said oil tank is provided with a window.

4. The aid to determining the level of oil in an oil tank according to claim 1 wherein said window comprises a slit formed in said one of said walls proximate said oil tank.

5. The aid to determining the level of oil in an oil tank according to claim 1 wherein said viewing means includes an aperture means in said one of the walls, said detecting means further comprises an oil tank formed from a transparent material and a portion of said oil tank projects through said aperture means.

6. The aid to determining the level of oil in an oil tank according to claim 5 wherein said projecting portion of said oil tank comprises a tube communicating between two portions of said oil tank.

7. The aid to determining the level of oil in an oil tank according to claim 1 wherein said oil tank is arranged surrounding at least a portion of said fuel tank.

8. The aid to determining the level of oil in an oil tank according to claim 7 wherein said oil tank has the shape of a torus.

* * * * *